(12) United States Patent
Harris et al.

(10) Patent No.: US 7,280,480 B2
(45) Date of Patent: Oct. 9, 2007

(54) METHOD AND APPARATUS FOR TRANSMITTING AND RECEIVING DATA

(75) Inventors: John M. Harris, Chicago, IL (US); Dan Zhang, Vernon Hills, IL (US); Robert D. Battin, Kildeer, IL (US)

(73) Assignee: Motorola, Inc., Schaumburg, IL (US)

( * ) Notice: Subject to any disclaimer, the term of this patent is extended or adjusted under 35 U.S.C. 154(b) by 755 days.

(21) Appl. No.: 10/042,499

(22) Filed: Jan. 7, 2002

(65) Prior Publication Data
US 2003/0128716 A1    Jul. 10, 2003

(51) Int. Cl.
*H04L 12/26* (2006.01)
(52) U.S. Cl. .................. 370/236; 370/394; 370/450
(58) Field of Classification Search ............ 370/328, 370/338, 401, 394, 236; 714/748, 749
See application file for complete search history.

(56) References Cited

U.S. PATENT DOCUMENTS

| | | | |
|---|---|---|---|
| 5,031,179 A | 7/1991 | Yoshida et al. | |
| 5,737,357 A | 4/1998 | Retzer | |
| 6,507,582 B1 * | 1/2003 | Abrol | 370/394 |
| 6,621,796 B1 * | 9/2003 | Miklos | 370/236 |
| 6,718,500 B1 * | 4/2004 | Lee et al. | 714/749 |
| 6,781,971 B1 * | 8/2004 | Davis et al. | 370/329 |
| 6,956,855 B1 * | 10/2005 | Chang | 370/394 |
| 2002/0041596 A1 * | 4/2002 | Rezaiifar et al. | 370/394 |
| 2003/0028837 A1 * | 2/2003 | Oh | 714/748 |
| 2003/0123405 A1 * | 7/2003 | del Prado et al. | 370/331 |

FOREIGN PATENT DOCUMENTS

WO    WO 00/78054 A1    12/2000

* cited by examiner

*Primary Examiner*—Brian Nguyen (57) ABSTRACT

An idle frame counter is not reset after retransmission of a data frame. Additionally, if a non-acknowledgment (NAK) is received for the last data frame sent, then no more idle frames are transmitted. Finally, an Idle Acknowledgment (ACK) is transmitted when an idle frame has been received with a sequence number equal to the sequence number of the next new data frame expected.

14 Claims, 9 Drawing Sheets

METHOD AND APPARATUS FOR TRANSMITTING AND RECEIVING DATA

FIELD OF THE INVENTION

The present invention relates generally to transmitting and receiving data, and in particular, to a method and apparatus for transmitting and receiving data within a wireless communication system.

BACKGROUND OF THE INVENTION

In current Code Division Multiple Access (CDMA) communication systems a Radio Link Protocol (RLP) is utilized for the link layer to transport data traffic between a mobile unit and infrastructure equipment. RLP is a Negative-Acknowledgment (NAK) based protocol in that the receiver does not acknowledge correctly-received RLP frames. In-order delivery is accomplished with the use of a sequence number (SEQ) on each frame. RLP maintains a counter for the sequence number of the next new data frame to send [SEQ(S)] and a counter for the sequence number of the next new data frame it expects to receive [SEQ(R)]. RLP requests the retransmission of RLP frames when a frame is received with a sequence number greater than the next expected sequence number (SEQ(R)). Retransmission is accomplished by sending a NAK to the transmitter identifying the sequence number of the frame not received. Prior to receiving the NAK'd frame, subsequently transmitted RLP frames continue to be received by the receiver.

Figure 1:
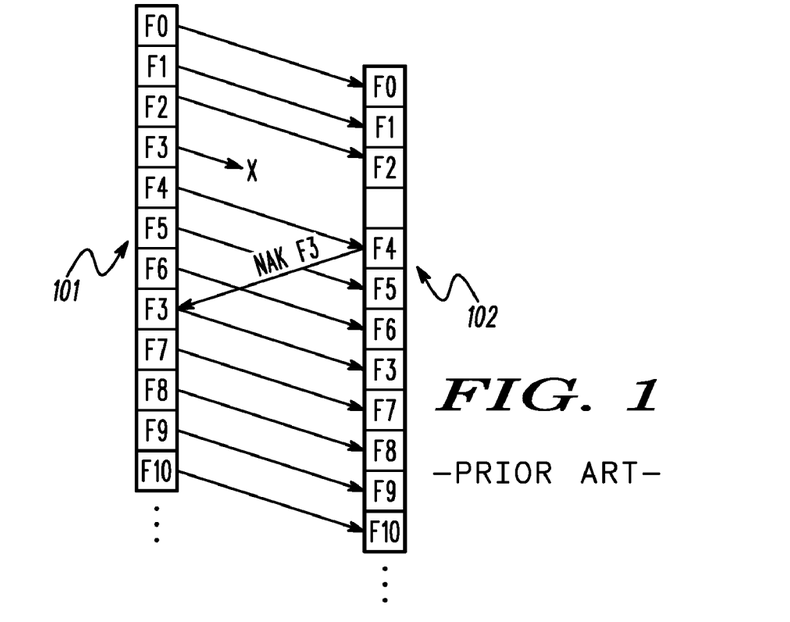
FIG. 1 illustrates prior-art data transmission.

FIG. 1 illustrates the current RLP NAK procedure. As shown frames 101 are transmitted by a transmitter over the air and are received by a receiver as frames 102. During over-the-air transmission, oftentimes data is lost and needs to be retransmitted to the receiver. This is illustrated in FIG. 1 as frame F3 being lost. Upon receiving frame F4, the receiver immediately realizes that frame F3 is missing and requests retransmission of F3 by sending a NAK to the transmitter. Upon reception of the NAK, the transmitter immediately retransmits F3 to the transmitter.

A problem arises when the last data frame transmitted in a bearer data burst (e.g. an upload or download) by the transmitter is not received. In this situation, the receiver will receive no subsequent frames so the receiver will not find out the last data frame was never received, unless/until another bearer frame is sent by the transmitter. More particularly, because RLP determines lost frames by a break in frame sequence number, the receiver needs to receive subsequently transmitted frames in order to determine if a frame has not been received.

Figure 2:
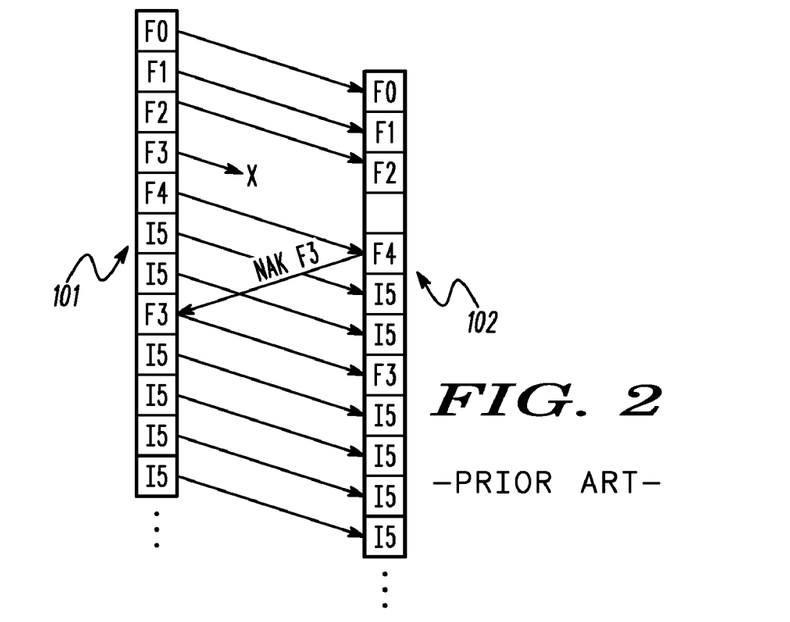
FIG. 2 illustrates prior-art data transmission.

In order to solve this problem, prior art systems transmit a predetermined number of idle frames after the last data frame is transmitted. The idle frames comprise a frame number equal to the next frame number in the sequence of data frames. This is illustrated in FIG. 2. As shown in FIG. 2, the last data frame sent (F4) is followed by a series of idle frames (I5) and when F3 is retransmitted, the series of idle frames also follow. When the receiver receives the idle frame I5, it knows that the data transmission has ended, and that F4 is the highest data frame transmitted to the receiver.

Although sending idle frames solves the above-mentioned problem, another problem arises in that the transmission of idle frames negatively impacts radio frequency (RF) and network capacity. In particular, because a CDMA system is a self-interfering system, all transmissions over the system result in added system interference, network capacity load, and in some cases Mobile Subscriber (MS) battery drain.

Therefore, a need exists for a method and apparatus for data transmission that allows a receiver to know when a last data frame has not been received, yet reduces the amount of system interference and network capacity loading relative to prior-art systems.

DETAILED DESCRIPTION OF THE DRAWINGS

In order to address the above-mentioned need, a method and apparatus for data transmission is provided herein. In accordance with the preferred embodiment of the present invention several techniques are utilized to reduce the number of idle frames transmitted. In particular, unlike prior art systems, in the preferred embodiment of the present invention the idle frame counter is not reset after retransmission of a data frame. Additionally, if a NAK is received for the last data frame sent, then no more idle frames are transmitted. Finally, an Idle Acknowledgment (ACK) is transmitted when an idle frame has been received with a sequence number equal to the sequence number of the next new data frame expected.

Utilizing the above techniques results in fewer idle frames being transmitted when data transmission is completed. Because of this, system interference and network loading are greatly reduced.

The present invention encompasses a method for data transmission where a predetermined number (N) of idle frames are sent when data transmission is completed. The method comprises the steps of transmitting a plurality of data frames to a remote unit, determining that a final data frame has been transmitted to the remote unit, and transmitting a first plurality (K) of idle frames in response to the determination that the final data frame has been transmitted to the remote unit. Once a NAK has been received, the improperly-received data frame is retransmitted and an additional N-K idle frames are transmitted to the remote unit.

The present invention additionally encompasses a method for data transmission where a predetermined number of idle frames are sent when data transmission is completed. The method comprises the steps of transmitting a plurality of data frames to a remote unit, determining that a final data frame has been transmitted to the remote unit, and transmitting a first plurality of idle frames in response to the determination that the final data frame has been transmitted to the remote unit. Once a NAK has been received from the remote unit indicating that the final data frame was improperly received, transmission of idle frames ceases.

The present invention additionally encompasses a method for data transmission. The method comprises the steps of receiving a plurality of data frames, determining that a data frame was improperly received, and sending a negative acknowledgment (NAK) in response to the determination that the data frame was improperly received. In addition to sending NAKs, when idle frames are received and acknowledgment (ACK) is sent in response to the received idle frame.

The present invention additionally encompasses an apparatus for transmitting data within a communication system where a predetermined number (N) of idle frames are sent when data transmission is completed. The apparatus comprises transmitting circuitry for outputting a plurality of data frames and idle frames to a remote unit, receiving circuitry having a NAK'd data frame as an input, and logic circuitry, determining that a final data frame has been transmitted to the remote unit and instructing the transmitting circuitry to transmit a first plurality (K) of idle frames in response to the determination that the final data frame has been transmitted to the remote unit and to transmit N-K idle frames to the remote unit after retransmitting the NAK'd data frame.

The present invention additionally encompasses an apparatus for transmitting data within a communication system. The apparatus comprises transmitting circuitry for outputting a plurality of data frames and idle frames to a remote unit, receiving circuitry having a NAK'd data frame as an input, and logic circuitry, determining that a final data frame has been transmitted to the remote unit and instructing the transmitting circuitry to send no more idle frames if the NAK'd data frame is requesting retransmission of the final data frame.

The present invention additionally encompasses a remote unit comprising receiving circuitry for receiving data frames and idle frames and an ACK/NAK generator coupled to the receiving circuitry for generating a NAK in response to poorly received frames and additionally for generating an ACK in response to idle frames received.

Figure 3:
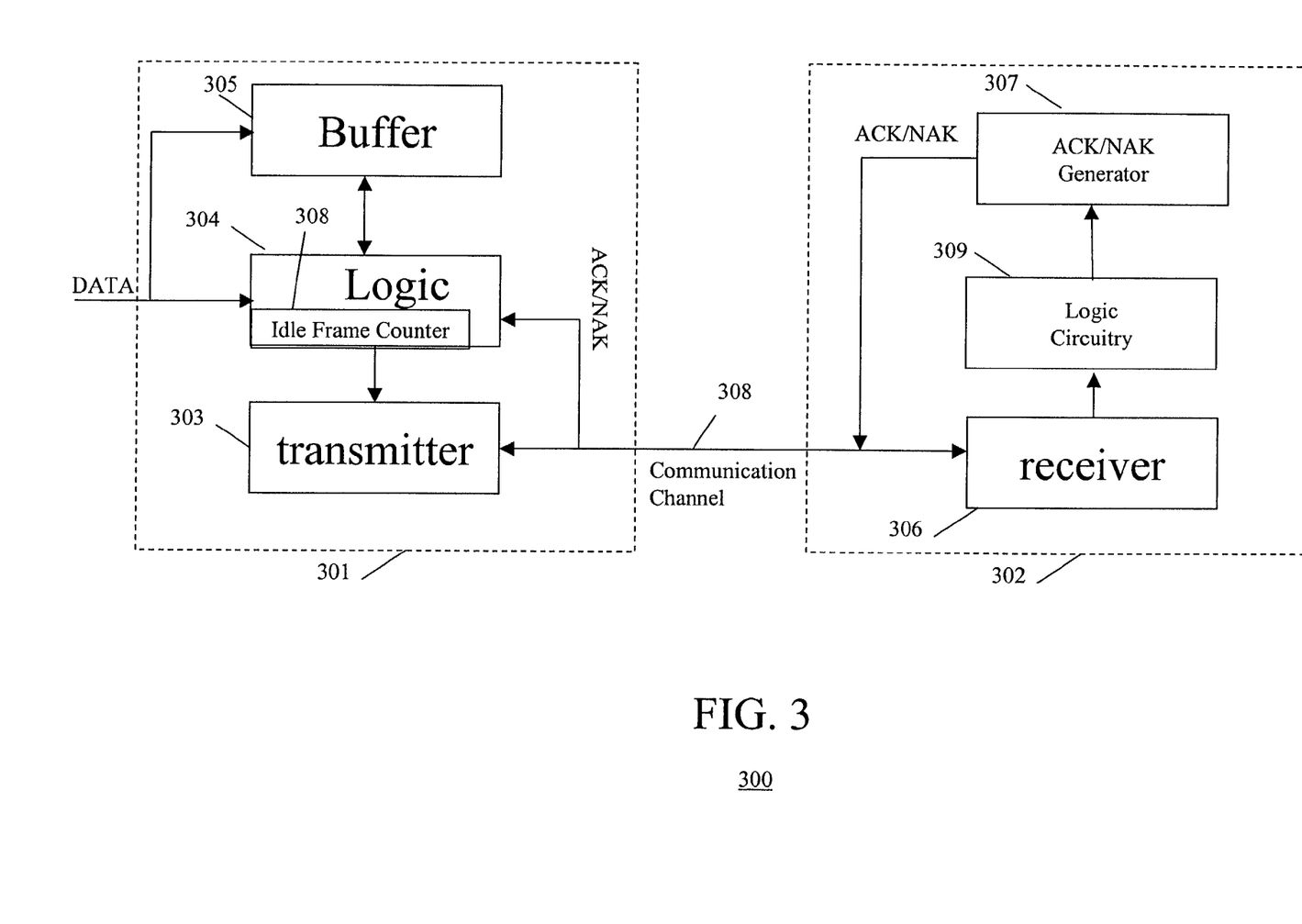
FIG. 3 is a block diagram of a communication system in accordance with the preferred embodiment of the present invention.

Turning now to the drawings, wherein like numerals designate like components, FIG. 3 is a block diagram of communication system 300 in accordance with the preferred embodiment of the present invention. As shown, communication system 300 comprises transmitting circuitry 301 and receiving circuitry (or remote unit) 302. Transmitting circuitry is preferably a CDMA Radio Access Network such as a Motorola SC Centralized Base Site Controller and Motorola SC 4800 Base Transceiver System, and receiving circuitry is preferably a mobile, or cellular handset such as a Motorola StarTAC®.

During operation data enters logic unit 304 and buffer 305. The data is passed from logic unit 304 to transmitter 303 where it is transmitted over communication channel 308 to receiving circuitry 302. The CDMA over-the-air protocol utilizes RLP. As discussed above, RLP is a Negative-Acknowledgment based protocol in that the receiver does not acknowledge correctly-received RLP frames. Receiving circuitry 302 only requests the retransmission of missing RLP frames by sending a NAK to the transmitter. In particular, when a frame is received out of sequence, receiver 306 will instruct ACK/NAK generator 307 to NAK the improperly received (or un-received) frame. The NAK will be transmitted over communication channel 308 and received by transmitting circuitry 301 (via a receiver, not shown).

The NAK is eventually received by logic unit 304, and logic unit 304 retrieves the lost frame from buffer 305 and instructs transmitter 303 to retransmit the frame to receiving circuitry 302. Once all data has been transmitted to receiving circuitry 302, logic unit 304 instructs transmitter 303 to transmit a predetermined number (N) of idle frames having a sequence number incremented from the last frame sent. More particularly, if the last data frame sent had sequence number M, then N idle frames are transmitted, each having sequence number M+1. In order to keep track of the number of idle frames transmitted to receiving circuitry 302, logic unit 304 utilizes idle frame counter 308.

As discussed above, although sending idle frames are necessary, a problem arises in that the transmission of idle frames negatively impacts radio frequency (RF) capacity and network capacity. In order to address this problem the number of idle frames transmitted by transmitting circuitry 301 is limited in the following ways:

Retransmission of a Data Frame does not Reset the RLP Idle Frame Counter

During prior art transmission and reception, idle frame counter 308 would be reset upon the retransmission of any data frame. For example, referring to FIG. 2, the last data frame transmitted (F4) resulted in the transmitter attempting to transmit four idle frames to the receiver. However, after only two idle frames being sent, frame F3 was retransmitted. This resulted in the idle frame counter being reset, and four idle frames were transmitted after frame F3 was retransmitted (N=4 in this example).

Figure 4:
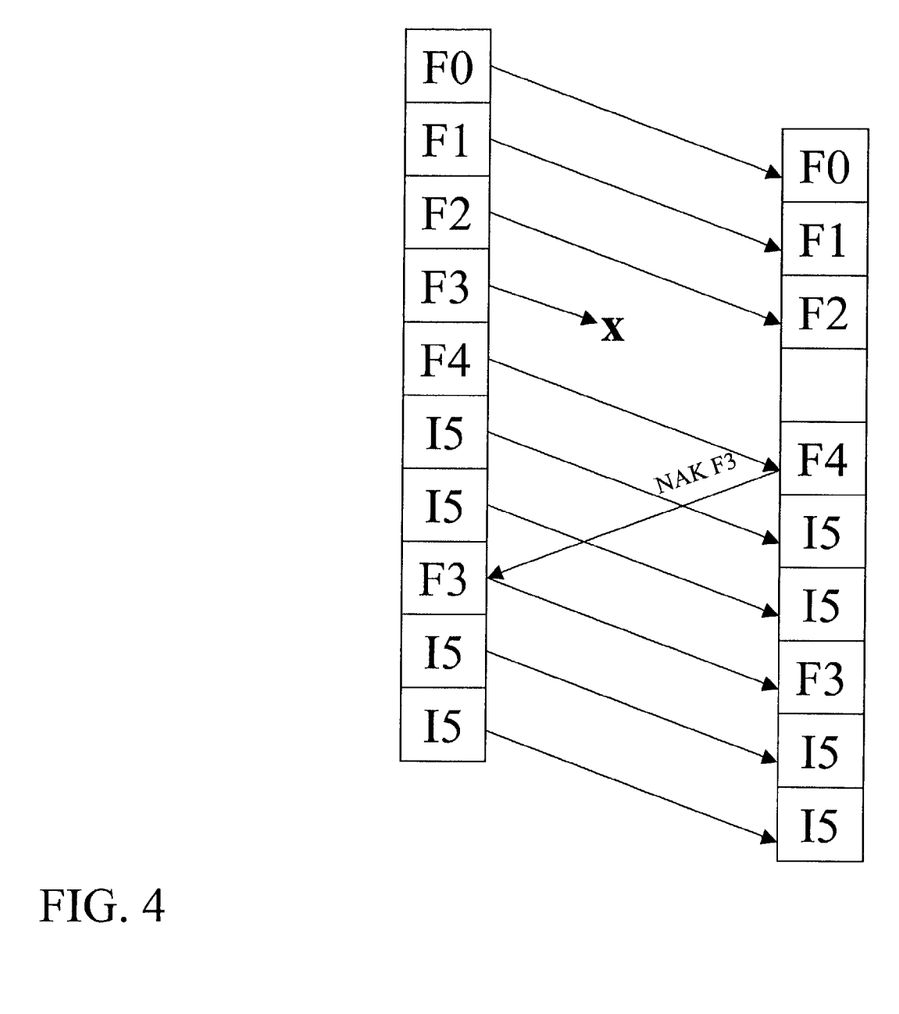
FIG. 4 illustrates data transmission in accordance with the preferred embodiment of the present invention.

Unlike prior art systems, in the preferred embodiment of the present invention the idle frame counter is not reset after retransmission of a data frame. This is illustrated in FIG. 4. As shown, once logic circuitry 304 determines that a final data frame has been transmitted to receiving circuitry 302, transmitting circuitry 301 attempts to send N=4 idle frames to receiving circuitry 302. After two idle frames being sent, frame F3 was retransmitted in response to a NAK being received. Instead of attempting to send four idle frames after resending frame F3, logic unit 304 causes transmitter 303 to transmit N-K idle frames to receiving circuitry 302, where K is the number of idle frames already transmitted. Because idle frame counter 308 is not reset after retransmission of frames, fewer idle frames are transmitted to receiving circuitry 302, resulting in less system interference and network loading.

Figure 5:
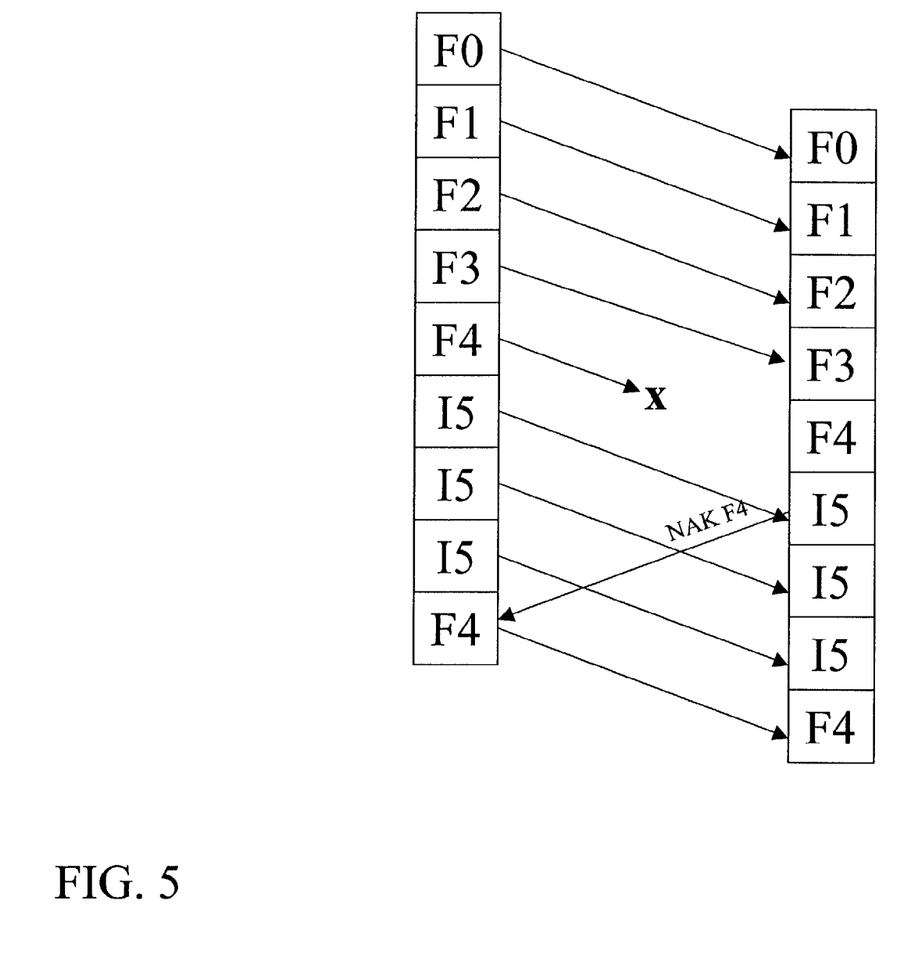
FIG. 5 illustrates data transmission in accordance with the preferred embodiment of the present invention.

Send no more Idle Frames if a NAK is Received for the Highest Data Sequence Number Sent Logically, if the highest (final) data frame has been NAK'd, then the receiving circuitry must have received an idle frame in order to detect the missed data frame. Therefore, in the preferred embodiment of the present invention, if a NAK is received for the final data frame sent, then no more idle frames are transmitted. This is illustrated in FIG. 5. As shown, the final data frame (F4) has been NAK'd by receiving circuitry 302. Because of this, receiving circuitry must have properly received an idle frame with sequence number 5 (I5). Therefore, after retransmission of the frame, no more idle frames are sent. Because transmitting circuitry 301 does not continue to send idle frames after the last data frame is NAK'd, fewer idle frames are transmitted to receiving circuitry 302, resulting in less system interference.

Figure 6:
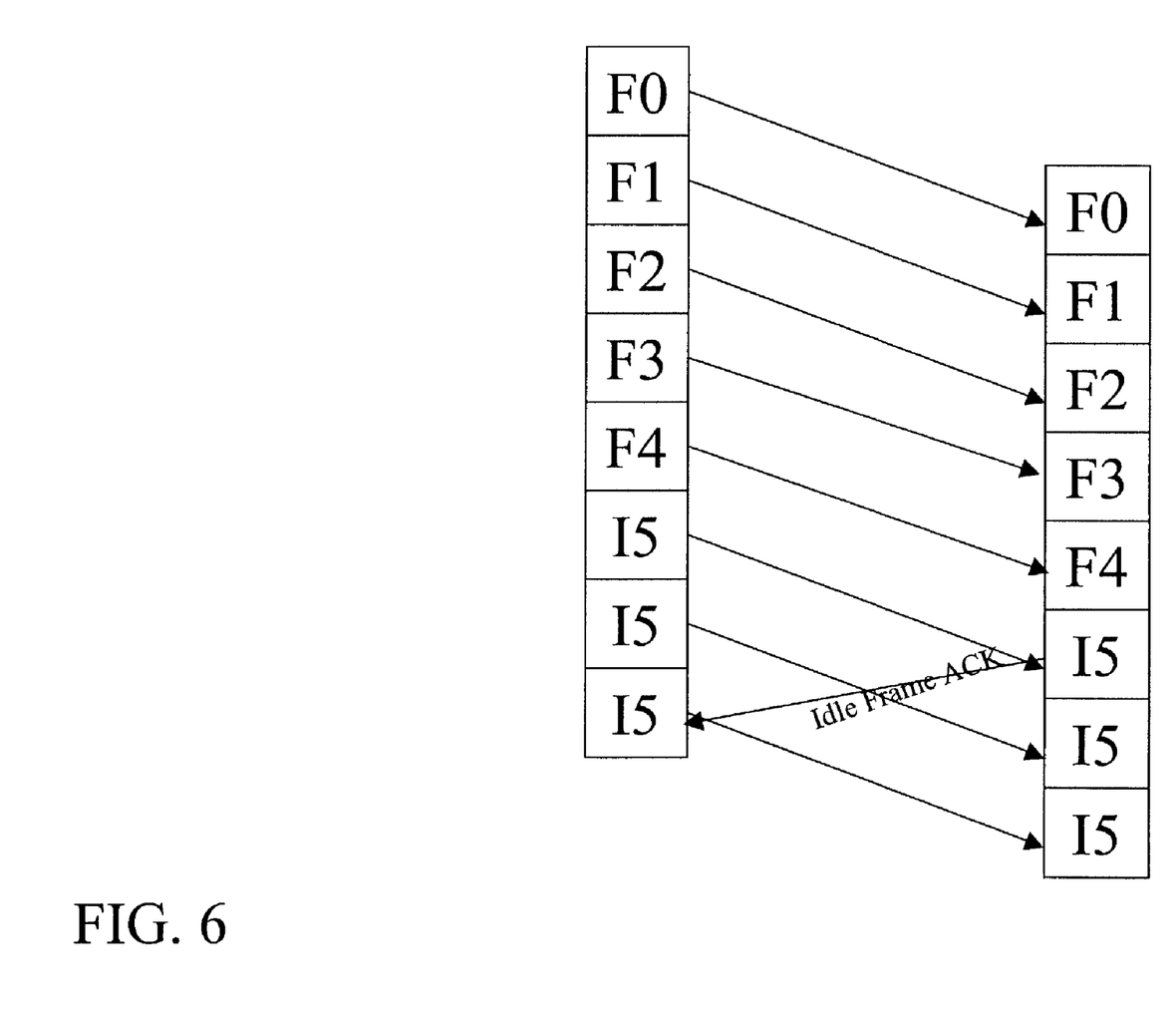
FIG. 6 illustrates data transmission in accordance with the preferred embodiment of the present invention.

Receiver Sends an Idle-Frame Acknowledgment (Idle ACK) when an Idle Frame is Received In the preferred embodiment of the present invention an Idle Acknowledgment (ACK) is transmitted when an idle frame has been received with a sequence number equal to the sequence number of the next new data frame expected. Upon reception of the Idle_ACK, transmitting circuitry 301 will cease sending idle frames to the receiving circuitry 302. This is illustrated in FIG. 6. As shown, once receiving circuitry 302 receives an idle frame with the next expected sequence number, an idle ACK is transmitted to transmitting circuitry. The idle ACK indicates to transmitting circuitry 301 that an idle frame has been received by receiving circuitry 302 with the corresponding sequence number. Transmitting circuitry immediately ceases sending any further idle frames if the Idle_Ack's sequence number is equal to the next sequence number to be sent. Because transmitting circuitry 301 does not continue to send idle frames after receiving an idle ACK, fewer idle frames are transmitted to receiving circuitry 302, resulting in less system interference.

Figure 7:
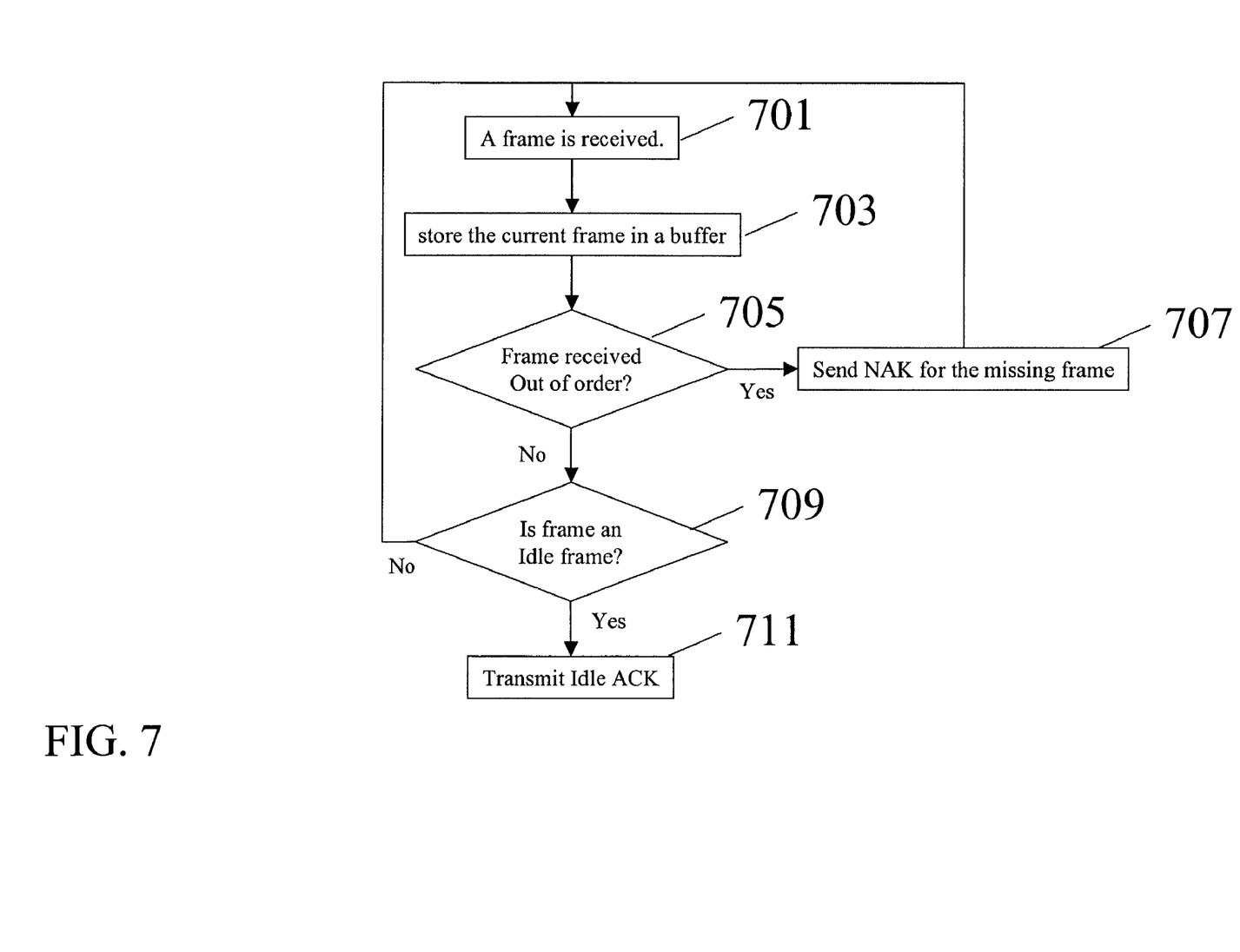
FIG. 7 is a flow chart showing operation of the receiver of FIG. 3 in accordance with the preferred embodiment of the present invention.

FIG. 7 is a flow chart showing operation of the receiver of FIG. 3 in accordance with the preferred embodiment of the present invention. The logic flow begins at step 701 where receiver 306 receives a frame. At step 703, logic unit 309 stores the current frame in a buffer (not shown), and at step 705, logic unit determines if a frame was received out of order. If, at step 705, logic unit 309 determines that a frame has been received out of order, then the logic flow continues to step 707, where a NAK is sent for the missing frame, otherwise the logic flow continues to step 709. At step 709, logic unit 309 determines if the received frame was an idle frame, and if so, the logic flow continues to step 711 where an idle-frame ACK is transmitted. As discussed above, the idle-frame acknowledgment indicates to the transmitter that an idle frame has been received, causing the transmitter to cease transmitting idle frames. If at step 709, logic unit 309 determines that an idle frame has not been received, the logic flow returns to step 701.

As discussed above, because transmitting circuitry 301 does not continue to send idle frames after receiving an idle ACK, fewer idle frames are transmitted to receiving circuitry 302, resulting in less system interference.

Figure 8:
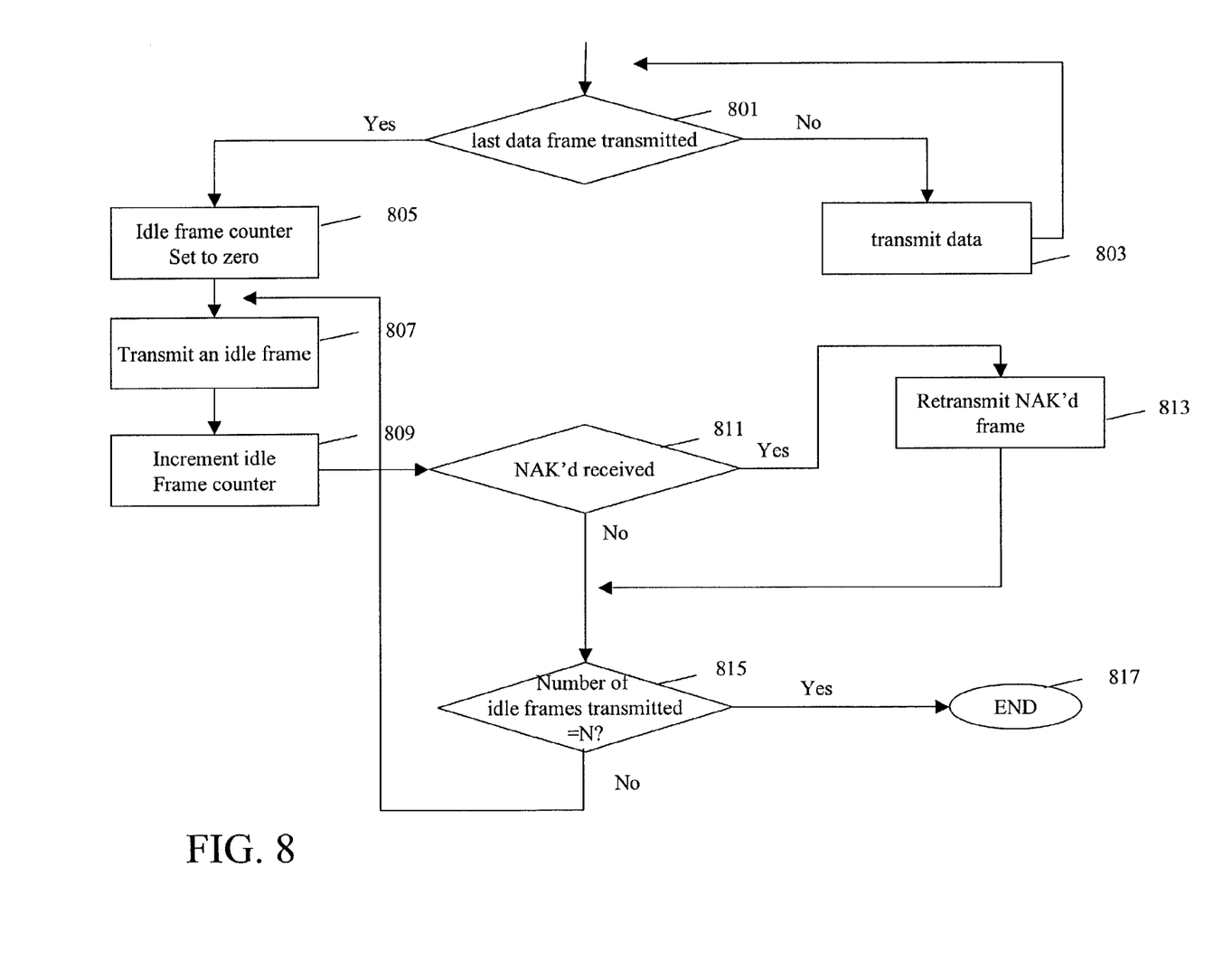
FIG. 8 is a flow chart showing operation of the transmitter of FIG. 3 in accordance with the preferred embodiment of the present invention.

FIG. 8 is a flow chart showing operation of the transmitter of FIG. 3 in accordance with a first preferred embodiment of the present invention. In accordance with the first preferred embodiment, retransmission of a data frame does not reset the RLP idle frame counter. The logic flow begins at step 801 where logic unit 304 determines if the last data frame has been transmitted. If, at step 801 it is determined that the last data frame has not been transmitted, then the logic flow continues to step 803 otherwise the logic flow continues to step 805 where the idle frame counter is initialized (set to zero). At step 803 logic unit 304 instructs transmitter 303 to transmit the data frame and the logic flow returns to step 801.

After initializing the idle frame counter (step 805) the logic flow continues to step 807 where logic unit 304 instructs transmitter 303 to transmit an idle frame to the receiving circuitry. As discussed above, the idle frame includes a frame number incremented from the last data frame transmitted. After transmitting the idle frame, logic unit 304 increments the idle frame counter (step 809). Next, logic unit 304 determines if a NAK has been received (step 811), and if so logic unit 304 instructs transmitter 303 to retransmit the NAK'd frame (Step 813). The logic flow then continues to step 815. If at step 811 it is determined that a NAK has not been received, then the logic flow continues to step 815 where it is determined if the number of idle frames transmitted is equal to a threshold (N). If, at step 815 it is determined that the number of frames transmitted is equal to N, then the logic flow ends at step 817, otherwise the logic flow returns to step 807.

As discussed above, because idle frame counter 308 is not reset after retransmission of frames, fewer idle frames are transmitted to receiving circuitry 302, resulting in less system interference.

Figure 9:
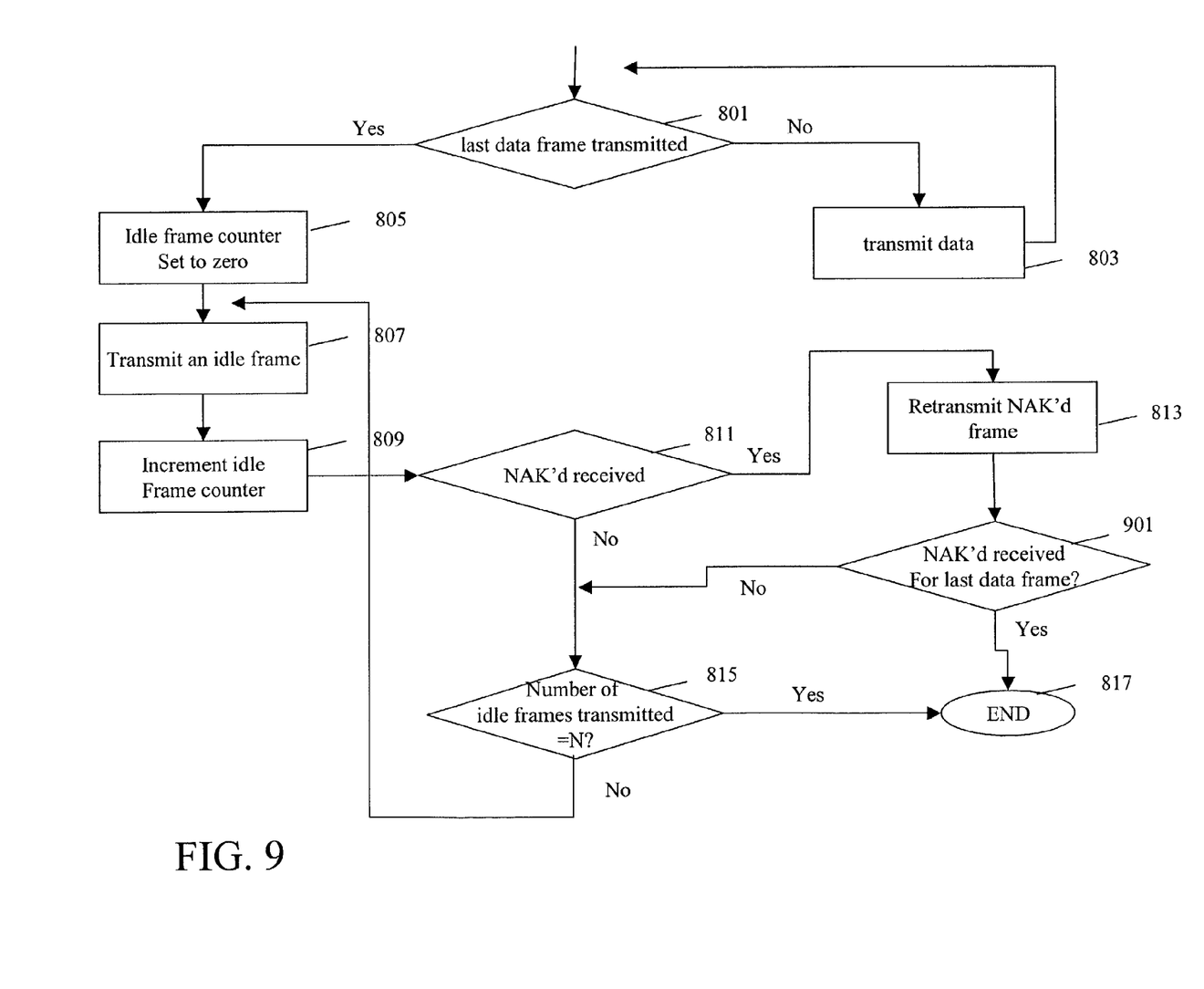
FIG. 9 is a flow chart showing operation of the transmitter of FIG. 3 in accordance with the preferred embodiment of the present invention.

FIG. 9 is a flow chart showing operation of the transmitter of FIG. 3 in accordance with a second preferred embodiment of the present invention. In accordance with the second preferred embodiment, idle frames cease being transmitted when the last or final data frame is NAK'd. The logic flow is similar to the logic flow described in FIG. 8, except for the addition of step 901. In particular, after the NAK'd frame has been transmitted (step 813), logic unit 304 will check to determine if the frame NAK'd was the last data frame transmitted (step 901), and if so, the and the logic flow ends at step 817, otherwise the logic flow continues to step 815. Additionally, in an alternate embodiment of the present invention, a fill frame my be utilized to determine if idle-frame transmission can cease. In this case, step 901 will determine if a fill frame has been received, and check to see if the sequence number is incremented from the last data frame transmitted. If so, idle-frame transmission will cease.

The above logic flow results in no more idle frames being sent if the last data frame is NAK'd. Because transmitting circuitry 301 does not continue to send idle frames after the last data frame is NAK'd, fewer idle frames are transmitted to receiving circuitry 302, resulting in less system interference.

Figure 10:
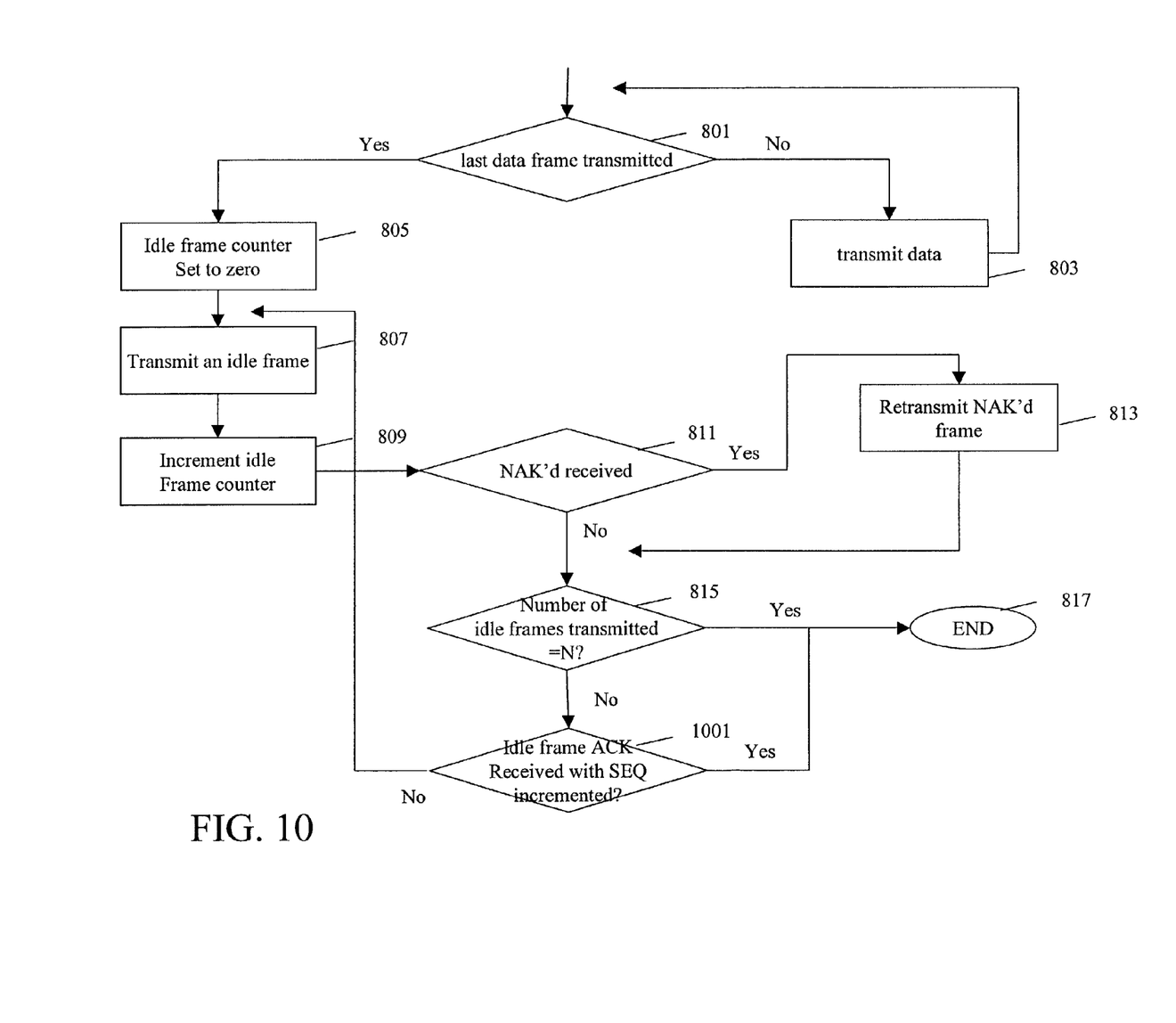
FIG. 10 is a flow chart showing operation of the transmitter of FIG. 3 in accordance with the preferred embodiment of the present invention.

FIG. 10 is a flow chart showing operation of the transmitter of FIG. 3 in accordance with a third preferred embodiment of the present invention. In accordance with the third embodiment, transmission of idle frames ceases after reception of an idle-frame ACK. The logic flow is similar to the logic flow described in FIG. 8, except for the additions of step 1001. In particular, at step 1001 it is determined if an idle-frame ACK has been received with a sequence number incremented from the final data frame sent, and if so, the logic flow ends (step 817) without transmission of further idle frames, otherwise the logic flow returns to step 807.

Because transmitting circuitry 301 does not continue to send idle frames after receiving an idle ACK, fewer idle frames are transmitted to receiving circuitry 302, resulting in less system interference.

The following text shows those changes necessary to implement the above embodiments into RLP. In particular, the following text shows changes to TIA/EIA/IS-707-A-2.10 necessary to implement the above procedures into RLP. Those sections underlined are necessary additions to RLP.

3.6.1.2 Idle Timer Operation

Once every 20 ms, RLP shall perform the following:
   If RLP supplies any non-blank, non-retransmission, non-idle, and non-fill RLP frame to the multiplex sublayer, RLP shall reset the idle timer to an implementation-dependent value and set the idle frame transmission counter to 0.
   Otherwise, if RLP supplies a non-retransmission frame to the multiplex layer, RLP shall decrement the idle timer. If this causes the idle timer to expire (i.e., its value reaches 0), RLP shall generate an idle frame and classify it as a data frame, shall reset the idle timer to an implementation-dependent value, and shall increment the idle frame transmission counter. When the idle frame transmission counter reaches an implementation-dependent value, the idle timer shall be disabled.

3.6.2.2 IDLE Frame Processing

For each received idle frame, RLP shall compute L_SEQ from the following relation:

$$L\_SEQ = \{SEQ + [SEQ\_HI \times 256]\}.$$

If RLP has identified the frame as a delayed RLP frame, it shall discard the frame.

If the received idle frame is formatted as specified in 4.5.1 and L_SEQ is equal to L_V(R), RLP shall create an Idle Ack frame as specified in 4.5.1 and classify it as a data frame. The number of Idle Ack frames sent per a given L_V(R) value may be limited to an implementation dependent value.

If the received idle frame is formatted as specified in 4.5.1 and L_SEQ is greater than L_V(R), RLP shall create a NAK List entry for each missing data frame and missing segment of a data frame with sequence number from L_V(R) to (L_SEQ-1) modulo 4096, inclusive. Each NAK List entry shall contain the sequence number of one of the missing data frames or missing segment of a data frame. RLP shall then set L_V(R) to L_SEQ.

If the received idle frame is formatted as specified in 4.5.2, L_SEQ is greater than or equal to L_V(R), and if RLP determines that there are missing data octets, RLP shall create a NAK List entry for each missing data frame and missing segment of a data frame with sequence number from L_V(R) to L_SEQ, inclusive.

If L_SEQ is less than L_V(N), RLP shall perform the reset procedures specified in 3.4.

3.6.2.3 Fill Frame Processing

For each received fill frame, RLP shall compute $L\_V(N)_{peer}$ from the following relation:

$$L\_V(N)_{peer} = \{SEQ + [SEQ\_HI \times 256]\}.$$

If $L\_V(N)_{peer}$ is greater than L_V(S), RLP shall perform the reset procedures specified in 3.4. If L_V(N)peer is equal to L_V(S), RLP shall disable the idle timer.

3.6.2.4 NAK Control Frame Processing

For each valid received NAK control frame, RLP shall compute $L\_V(N)_{peer}$ from the following relation:

$$L\_V(N)_{peer} = \{SEQ + [SEQ\_HI \times 256]\}.$$

If $L\_V(N)_{peer}$ is greater than L_V(S), RLP shall perform the reset procedures specified in 3.4.

If L_V(N)peer is equal to L_V(S)-1, RLP shall disable the idle timer.

RLP shall generate a copy of each requested data frame or segment of a data frame. The retransmission shall occur as either an unsegmented data frame or as one or more segmented data frames. If the NAK requests any sequence number greater than L_V(S), RLP shall perform the reset procedures specified in 3.4.

3.6.2.7 Idle_Ack Control Frame Processing

For each received Idle_Ack frame, RLP shall compute L_SEQ from the following relation:

$$L\_SEQ = \{SEQ + [SEQ\_HI \times 256]\}.$$

If L_SEQ does not equal L_V(S), RLP shall discard the frame.

If L_SEQ equals L_V(S), RLP shall disable the idle timer 4.5 Idle/Idle_Ack Frames If RLP is in synchronous mode, RLP shall use the frame formats specified in 4.5.2.

4.5.1 Idle/Idle_Ack Frame Format 1

| Field | Length (bits) |
|---|---|
| SEQ | 8 |
| CTL | 4 |
| SEQ_HI | 4 |
| Padding | Variable |

SEQ—This field contains the least significant 8 bits of
  L_V(S) - Idle frame.
  L_V(R) - Idle Ack control frame.
CTL—These bits shall be set to
  '1010' - Idle frame.
  '1011' - Idle Ack control frame.
SEQ_HI—This field shall contain the most significant 4 bits of
  L_V(S) - Idle frame.
  L_V(R) - Idle Ack control frame.
Padding—Padding bits. As required to fill the remainder of the frame. These bits shall be set to '0'.

While the invention has been particularly shown and described with reference to a particular embodiment, it will be understood by those skilled in the art that various changes in form and details may be made therein without departing from the spirit and scope of the invention. For example, although the above description employs several techniques for reducing the number of idle frames transmitted, one of ordinary skill in the art will recognize that any combination of the above-mentioned techniques may be utilized. It is intended that such changes come within the scope of the following claims.

The invention claimed is:

1. A method for data transmission where a predetermined number (N) of idle frames are sent when data transmission is completed, the method comprising the steps of:
   transmitting a plurality of data frames to a remote unit;
   determining that a final data frame has been transmitted to the remote unit;
   transmitting a first plurality (K) of idle frames in response to the determination that the final data frame has been transmitted to the remote unit;
   receiving a negative acknowledgment (NAK) from the remote unit indicating that a data frame was improperly received;
   retransmitting the improperly-received data frame; and
   transmitting N-K idle frames to the remote unit after retransmitting the data frame.

2. The method of claim 1 wherein the step of transmitting the first plurality of idle frames comprises the step of transmitting the first plurality of idle frames, each having a sequence number incremented from the final data frame transmitted.

3. The method of claim 1 wherein the step of receiving the negative acknowledgment comprises the step of receiving the negative acknowledgment, wherein the negative acknowledgment comprises a sequence number for a frame not received by the remote unit.

4. The method of claim 1 further comprising the steps of:
   determining if the NAK is requesting retransmission of the final data frame; and sending no more idle frames if the NAK is requesting retransmission of the final data frame, otherwise sending N-K idle frames to the remote unit after retransmitting the data frame.

5. A method for data transmission where a predetermined number of idle frames are sent when data transmission is completed, the method comprising the steps of:
    transmitting a plurality of data frames to a remote unit;
    determining that a final data frame has been transmitted to the remote unit;
    transmitting a first plurality of idle frames in response to the determination that the final data frame has been transmitted to the remote unit;
    receiving a negative acknowledgment (NAK) from the remote unit indicating that the final data frame was improperly received;
    retransmitting the final data frame; and
    sending no more idle frames after the retransmission of the final data frame in response to the determination that the final data frame was improperly received.

6. The method of claim 5 wherein the step of transmitting the first plurality of idle frames comprises the step of transmitting the first plurality of idle frames, each having a sequence number incremented from the final data frame sent.

7. The method of claim 5 wherein the step of receiving the NAK comprises the step of receiving the NAK, wherein the NAK comprises a sequence number for a frame not received by the remote unit.

8. An apparatus for transmitting data within a communication system where a predetermined number (N) of idle frames are sent when data transmission is completed, the apparatus comprising:
    transmitting circuitry for outputting a plurality of data frames and idle frames to a remote unit;
    receiving circuitry having a NAK'd data frame as an input; and
    logic circuitry, determining that a final data frame has been transmitted to the remote unit and instructing the transmitting circuitry to transmit a first plurality (K) of idle frames in response to the determination that the final data frame has been transmitted to the remote unit and to transmit N-K idle frames to the remote unit after retransmitting the NAK'd data frame.

9. The apparatus of claim 8 wherein the idle frames have a sequence number incremented from the final data frame transmitted.

10. The apparatus of claim 8 wherein the NAK comprises a sequence number for a frame not received by the remote unit.

11. The apparatus of claim 8 wherein the logic circuitry further instructs the transmitting circuitry to send no more idle frames if the NAK's data frame is requesting retransmission of the final data frame.

12. An apparatus for transmitting data within a communication system, the apparatus comprising:
    transmitting circuitry for outputting a plurality of data frames and idle frames to a remote unit;
    receiving circuitry having a NAK'd data frame as an input; and
    logic circuitry, determining that a final data frame has been transmitted to the remote unit and instructing the transmitting circuitry to send no more idle frames if the NAK'd data frame is requesting retransmission of the final data frame.

13. The apparatus of claim 12 wherein the idle frames have a sequence number incremented from the final data frame transmitted.

14. The apparatus of claim 12 wherein the NAK comprises a sequence number for a frame not received by the remote unit.

* * * * *